2 Sheets--Sheet 1.

W. G. MOORE.
Lathes.

No. 157,627. Patented Dec. 8, 1874.

Attest.
Inventor.

W. G. MOORE.
Lathes.
No. 157,627.
2 Sheets--Sheet 2.
Patented Dec. 8, 1874.
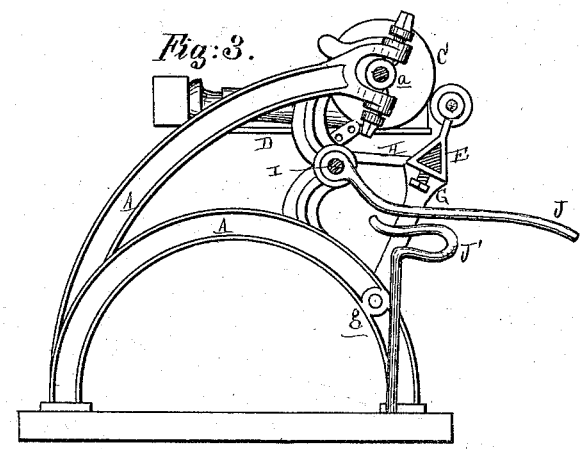
Fig: 3.
Fig: 5.
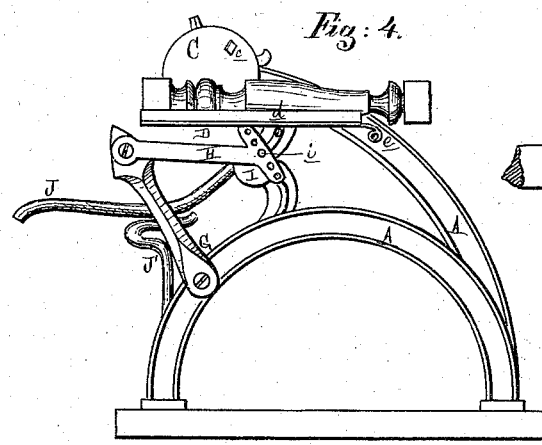
Fig: 4.
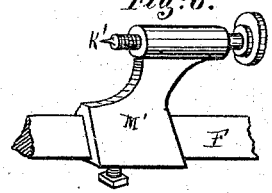
Fig: 6.
Fig: 7.
Fig: 8.
Attest.
C. E. Curtis
Wm. P. Shalding
Inventor.
W. G. Moore
By Attorney
Thos. S. Sprague

UNITED STATES PATENT OFFICE.

W. GEORGE MOORE, OF CHICAGO, ILLINOIS.

IMPROVEMENT IN LATHES.

Specification forming part of Letters Patent No. 157,627, dated December 8, 1874; application filed July 24, 1874.

*To all whom it may concern:*

Be it know that I, W. GEORGE MOORE, of Chicago, in the county of Cook and State of Illinois, have invented an Improvement in Lathes, of which the following is a specification:

The nature of my invention relates to an improved machine for cutting and shaping round, oval, and polygonal balusters, and other like articles, and for jointing or surfacing their square ends.

The invention consists in, first, the linked swinging bed, carrying the head and tail stocks, in combination with the spindle on the main frame, carrying a series of movable and adjustable cutters; secondly, in the double worm and screw gearing, for turning the baluster on its axis to produce balusters of various sections by the action of the cutters; thirdly, in the combination of the ratchet and pawl with the swinging bed for producing fluted angles; fourthly, in the combination of the swinging baluster-table with the face-plate and knife on the cutter-spindle for squaring the baluster ends; fifthly, in the arrangement of the cutters, each on an independent head, sliding on the cutter spindle.

Figure 1:
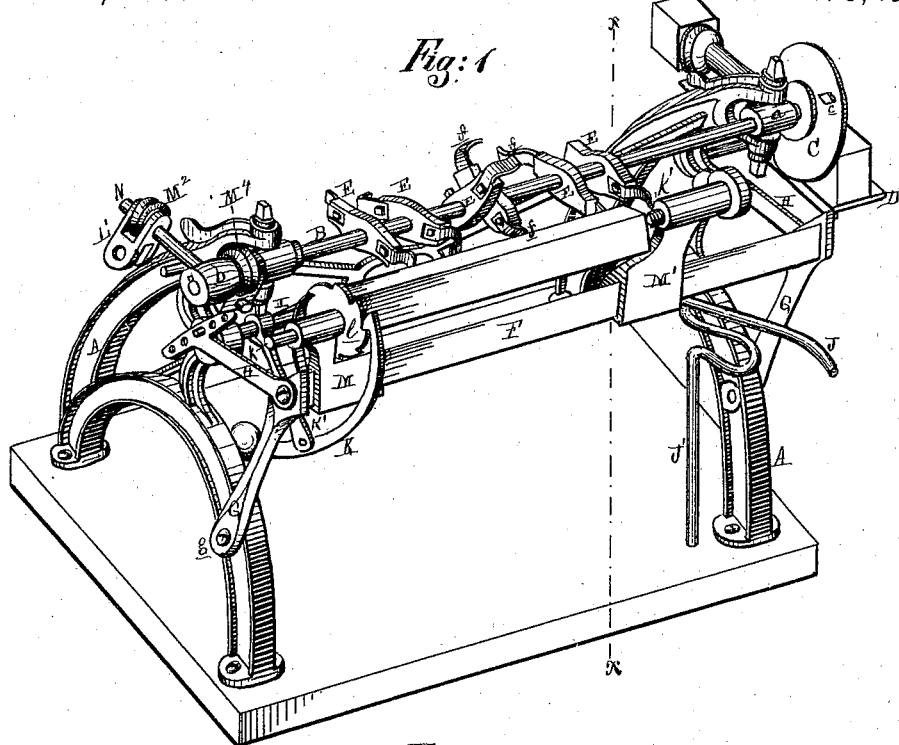
Figure 2:
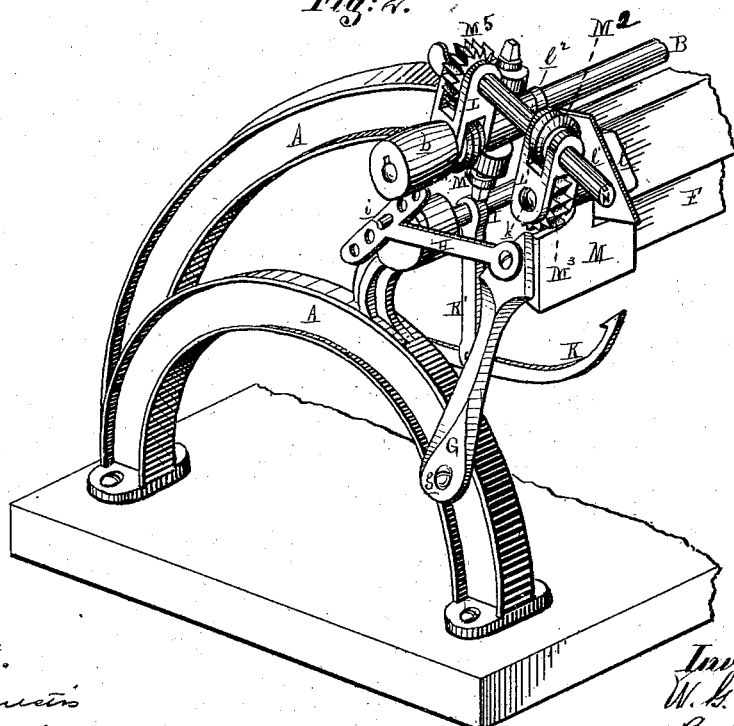

Figure 1, Sheet 1, is a perspective view of the machine, showing it arranged to cut the fluted baluster shown in Fig. 9, Sheet 2. Fig. 2 is a perspective view of one end of the machine as arranged for cutting round, oval, square, or polygonal balusters according to the contour of the gage-plate which is put on the head-stock in lieu of the ratchet. Fig. 3, Sheet 2, is a cross-section at $x\ x$ in Fig. 1. Fig. 4 is an elevation of the right end of the machine, showing the facing-wheel and its cutter. Fig. 5 is a perspective view of a cutter-head. Fig. 6 is a similar view of the tail-stock. Figs. 7 and 8 are views of various-shaped balusters which can be produced by this machine.

In the drawing, A represents the frame of the machine, the shape of which will be more clearly shown in Fig. 2. B is the cutter-spindle, journaled in adjustable bearings $a$ in terminal brackets on the top of the frame. At one end is a pulley, $b$, by which it is driven. At the other end is a face-plate, C, carrying one or more jointer-knives, $c$, for squaring up the ends of a baluster, which rests on a table, D, against a gage, $d$, the said table swinging in the vertical plane on a stud, $e$, projecting from the right-hand end of the frame. E E are cutter-heads, sleeved on and keyed to the spindle B, each carrying one or more curved cutters, $f$, bolted to it to produce the required outline on the baluster-blank. F is a triangular bar or bed, each end being inserted in the eye of a radius bar, G, whose lower end is pivoted to the frame at $g$. To each end of the bed an angular T-headed link, H, is pivoted. The head has a series of holes in it to receive an eccentric stud, $i$, on a rock-shaft, I, journaled in the frame, which rock-shaft has an arm, J, projecting to the front, and is held at any position by a spring-standard, J'. A weighted hook-pawl, K, is pivoted on the rod or arm K', projecting from the rock-shaft in the path of the face-chuck of the live spindle. M is the head-stock of the lathe, sleeved on, and secured to, the bed by a set-screw. $M^1$ is the tail-stock, in like manner sleeved on the bed, and is provided with a screw-spindle or center, $k'$. $k$ is the center or spindle in the head-stock, with a socket-chuck on its inner end to receive the baluster-blank.

For turning fluted balusters, as shown in Fig. 8, the spindle $k$ has mounted on it a ratchet, $l$, having a number of teeth equal to the number of flutes in the baluster. With this ratchet the pawl engages. By depressing the arm J the bed is carried with the blank toward the cutters, which, in their rotation, remove a portion of the wood from the blank to the contour described by the cutters in their rotation. Upon raising the arm J the pawl rotates the blank and head-spindle one notch as the bed is swung away from the cutters, the operation being repeated until the blank has been rotated once on its axis.

For turning other forms, the ratchet is removed from the spindle $k$, and a gage-plate of the desired contour substituted, a square one, $l^1$, being shown in Fig. 2, which revolves in contact with a collar, $l^2$, on the cutter-spindle, on whose projecting end a bifurcated yoke, L, is sleeved, next the driving-pulley, with a worm, $M^4$, feathered on the spindle in the bifurcation, which worm rotates a worm-gear, $M^5$, keyed on a shaft, N, journaled through a bifurcation in the top of the yoke, at a right angle with the lower one. L' is a similar yoke, sleeved on the projecting end of the head-stock spindle, on which is also keyed a worm-gear, M³, driven by a worm, M², feathered on the shaft N, which is journaled through the forked upper end of said yoke L'. The shaft N has free end play in its bearings and through the gears, and through which a slow motion is given the head-spindle and its blank in the rotation of the cutter-spindle. If the edge of the gage-plate be kept in contact with the collar $l^2$ it is evident that the blank will follow the contour of the gage-plate, and thus be reduced by the cutters to the same shape.

The outline of the article can be varied by properly adjusting the cutter-heads for that purpose.

What I claim as my invention is—

1. The bed F, pivoted by the radius bars G to the frame A, and studs $i$ and rock-shaft T, in combination with the worm-gears M² M³ M⁴ M⁵ and shaft N, constructed and arranged, substantially as described and shown, for the purpose set forth.

2. In a machine for cutting balusters, the cutter-spindle, having at one end the face-plate C, carrying the cutters $c$ for squaring up the end of a baluster, and the movable cutter-heads E, sleeved on said spindle and carrying the curved cutters $f$ to produce the required outline on the baluster-blank, as set forth.

3. The combination of the hooked pawl K, arm K', and ratchet $l$ with the head-spindle and rock-shaft, constructed and arranged as described, for the purpose set forth.

W. GEORGE MOORE.

Witnesses:
 WM. H. LOTZ,
 ALEX. SEYFARTH.